Aug. 12, 1958     H. W. PARKER     2,847,515

TRANSDUCER

Filed May 5, 1954

INVENTOR

Henry W. Parker

United States Patent Office

2,847,515
Patented Aug. 12, 1958.

2,847,515

TRANSDUCER

Henry W. Parker, Flushing, N. Y.

Application May 5, 1954, Serial No. 427,805

3 Claims. (Cl. 179—111)

The present invention relates to transducers, broadly to a method and means for converting small displacements into corresponding perceptible electrical variations, and specifically to a mobile electrode shaped to perform the function of improved linear transduction of mechanical displacement into electric potential so that the wave form of the mechanical excitation is more faithfully copied by the resulting electric potential wave form.

In detecting mechanical displacements of an order smaller than the wave-length of visible light, resort has been made to the use of transducers of the piezo-electric, electro-magnetic and planar-capacitor types. A piezo-electric crystal, such as Rochelle salt, has an unsatisfactory mechanical impedance for optimum transfer of energy from a variety of media because of its rigidity and has low sensitivity in the infrasonic region of a few cycles per second because of shunting leakances and relaxation effects. The electromagnetic transducer gives a response proportional to the time rate of change of amplitude of the wave form, which gives it poor sensitivity in the infrasonic region of a few cycles per second. The planar condenser microphone has a membrane of high stressed metal stretched to near its elastic limit in proximity to a polarizing electrode. The electric field, established to get transduction sensitivity, attracts the membrane with considerable electrostatic force when the separation of the electrodes is small and the applied polarizing potential is high; but these forces, which are proportional to the square of the electric field intensity are in equilibrium with the elastic forces of the stretched drum-head. The resulting effect in transduction is a distortion of the electrical response to a mechanical displacement of the membrane of the condenser microphone of the planar type.

Accordingly, it is the object of the present invention to provide an improved method and means for converting small mechanical displacements into sensible electric potential variations. Specifically, it is within the contemplation of the present invention to provide a motion-electric potential transducer of extremely high sensitivity and high fidelity, not only in the audible and near-ultrasonic range of frequencies but also in the infrasonic range down to a few cycles per second.

The electric potential variations produced by microscopic mechanical movement of the mobile electrode of this invention, have to be detected by an electric potential sensing tube which draws negligible amount of electric current such as I have described in my co-pending patent application, Serial Number 399,670 of December 22, 1953. The interdependency of the electric potential sensing device on the operation of the transducer of the present invention is mainly in the compacting of the circuit constants of the capacitance network in order to minimize the reduction of sensitivity by stray capacitances.

Among the many applications of the present invention, without limitation, are conducting microseismic studies, gauging micropolished surfaces, measuring extremely small temperature and strain variations, as well as more general applications including the provision of highly sensitive microphones, hearing aids, phonograph pick-ups and the like, where the transducer is used in conjunction with an electric potential sensing device which draws negligible electric current.

Certain objects of the invention are realized by the provision of a coaxial structure of the mobile electrode and its associated fixed polarizing electrodes, which coaxial structure of cylinders allows the pull of the electrostatic radial forces to be symmetrical about the axis in such a manner that the vector sum of the radially directed electrostatic forces is substantially zero. The axially directed pull of the electrostatic forces are balanced by the provision of an auxiliary fixed balancing electrode which is geometrically disposed with respect to the main fixed polarized electrode so that the electrostatic forces pulling to one side are balanced by the electrostatic forces pulling to the other side. In this manner, the axially directed forces are in balance and their vector sum is substantially zero. Thus there is provided a mobile electrode which is subjected to a zero sum vector field of electric forces, which fact allows the use of a light-weight free-floating type of mobile electrode made of such lightness that it can almost match the motional impedance of the air medium, thus providing a desirable property of a high fidelity acoustic transducer.

Other objects of the invention are realized by consideration of the circuitry of the capacitance network of the transducer, not only with respect to the insulation requirements but also with regards to the geometry of disposition of the capacitances for the purpose of reducing stray capacitance, which stray capacitance has an important effect on the sensitivity and the linearity of response of the transducer. The main electrode has to be so well insulated that its time constant is several hundred seconds, in order to follow the wave form of very low frequency mechanical excitation with high fidelity.

There are two preferred forms of my invention which I choose to describe in detail for purposes of illustration. One practical embodiment of the invention is a coaxial cylindrical structure of the transducer in the form of a sensitive high fidelity microphone, and the other is a simplified compact balanced transducer microphone combined with a potential sensing tube described in my co-pending patent application 399,670 of December 22, 1953.

The various features and aspects of the present invention including further objects and practical applications will be more fully appreciated upon reference to the following description of several presently preferred embodiments, when take in conjunction with the accompanying drawings, wherein:

In Fig. 2, the terminals of Fig. 1 are shown as 7, 14, and 15.

Fig. 2 shows Fig. 3 schematically with external batteries B1, B2, B3 and external resistors R1 and R2, necessary for operativeness of the microphone in a circuit.

Figure 1:
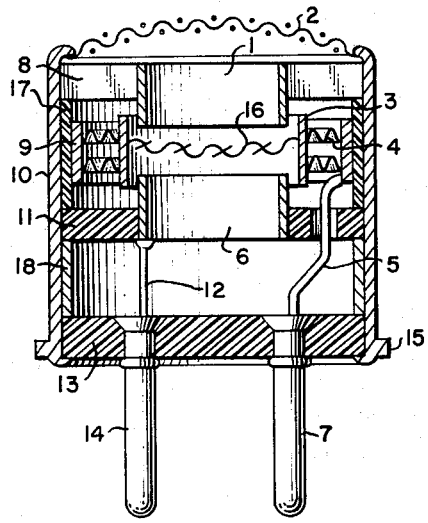
Fig. 1 is a diagrammatic showing of a coaxial form of the displacement-electric potential transducer of the present invention, arranged as a microphone providing high sensitivity and high fidelity from the infrasonic to the ultrasonic regions of the audible spectrum.

In Fig. 1 the mobile electrode is 1 and in Fig. 4 it is 50. The linear transduction characteristic of the transducer allows the mobile electrode to make a relatively large excursion without departing from linearity in a significant manner. This fact is basic in permitting a light-weight structure of the mobile electrode, made preferably of thin walled aluminum of such lightness that the mobile piston can nearly match the motional impedance of its associated air column. In this way the mobile electrode provides a large motion for the compression and rarefaction of the sound wave striking it with a minimum of reflected energy. The almost free-floating arrangement of the mobile electrode in the present invention is a new feature in the transducer art.

The varying applications of these basic principles will best be appreciated from the following description of presently preferred forms of the invention.

Referring now to Fig. 1, there is shown a microphone as a separate part for externally connecting to an incremental potential sensing tube. 1 shows the fixed auxiliary coaxial electrode which is grounded to the case 10 through the radial fins 8. 2 represents a protective wire guard to protect the electrodes from mechanical injury. 3 is the mobile coaxial electrode which is constrained to move axially by the metallic membranes shown corrugated at 4. 5 is a lead from metal ring 9 to pin 7, to which the polarizing potential is applied. 6 is the main fixed electrode connected through wire 12 to pin 14 and thence to a network comprising an incremental potential sensing tube with external batteries and resistors. 17 is an insulator sleeve isolating ring 9 from the case 10. 11 is an insulator supporting 6 and insulating it. 18 is a metal sleeve which acts as a spacer between 11 and 13. 16 is a light weight treated textile mounted on the movable electrode 3. 15 is the grounding means for the case 10. 15 is screw ferrule clamped to the cable connection of the normal microphone.

Figure 2:
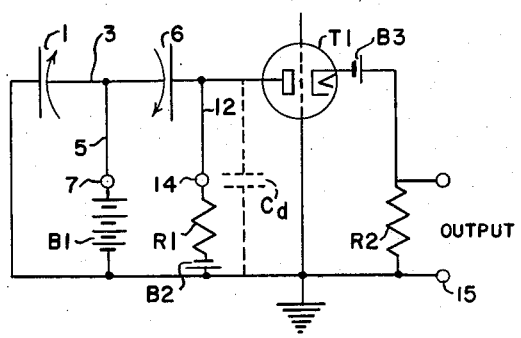
Fig. 2 is a schematic circuit representation showing the circuitry associated with the basic Fig. 1 and also Fig. 3 which has a potential sensing tube T1 added.

Fig. 2 is a schematic representation of the circuitry associated with the use of the microphone described in this specification. B1 is a polarizing battery of about 300 volts. B2 is a low potential battery keeping the control electrode at a small negative potential. B3 is a low voltage battery having a potential always less than the ionization potential of any residual gas in the incremental potential sensing tube T1. The capacitance $C_d$ represents the stray capacitance which, in a good design, is kept to a minimum.

Figure 3:
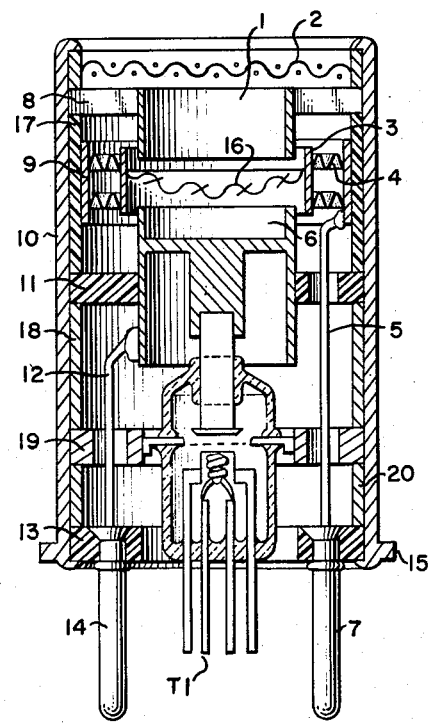
Fig. 3 is a diagrammatic showing of a potential sensing tube T1 mounted in the microphone casing to reduce the stray capacitance.

Fig. 3 shows an assembly of the coaxial microphone and its associated incremental potential sensing tube. 19 is a metal plate with holes bored to allow insulated passage of wires 5 and 12 and also to ground the grid of T1. 20 is a metal sleeve acting as a spacer for 19 and 13.

What I claim is:

1. A displacement-electric potential transducer comprising main and auxiliary coaxial cylinder capacitors and a common movable coaxial member electrode constrained to move axially, means for grounding the fixed electrode member of the auxiliary coaxial capacitor, means for applying a bias potential to the fixed insulated electrode member of the main coaxial cylinder capacitor, means for insulating the common movable coaxial member electrode and applying a polarizing potential thereto, the fixed electrodes of the main and auxiliary coaxial capacitors are placed in opposition and the axially directed electrostatic force of attraction of one capacitor on to the movable member opposes that of the other capacitor on to the movable member when the electrodes are electrically charged by the polarizing potential applied to the movable electrode, means for axially displacing the movable member of said capacitors, and means for sensing incremental potential changes induced on the fixed insulated electrode of the main capacitor by direct connection of the main fixed electrode to the control electrode of an incremental potential sensing tube whose input network supplies the bias potential and a network time constant comparable with the period of the lowest frequency to be sensed.

2. A displacement-electric potential transducer as described in claim 1, means for shielding the main and auxiliary capacitors and incremental potential sensing tube in a container, and means for a direct socket connection from the main insulated coaxial electrode to the control electrode of the contained incremental potential sensing tube.

3. A displacement-electric potential transducer comprising an insulated fixed main coaxial hollow metal cylinder member and a grounded fixed auxiliary coaxial hollow metal cylinder member symmetrically and coaxially mounted at opposite ends of a common movable insulated smaller diameter coaxial hollow metal cylinder member constrained to axial motion and partially entering the said main and auxiliary electrodes in the construction of an opposed pair of constant gap symmetrical capacitors, means for axially displacing the movable member of said capacitors and means for terminating the three electrodes of the transducer on a container.

References Cited in the file of this patent

UNITED STATES PATENTS

| | | |
|---|---|---|
| 1,641,438 | Jones | Sept. 6, 1927 |
| 1,762,981 | Hartley | June 10, 1930 |
| 2,033,479 | Murphy | Mar. 10, 1936 |
| 2,092,762 | Kroger | Sept. 4, 1937 |
| 2,579,162 | Veneklasen | Dec. 18, 1951 |